United States Patent [19]

Gibson et al.

[11] 4,263,612

[45] Apr. 21, 1981

[54] COMB FILTER EQUALIZATION CIRCUIT

[75] Inventors: Walter G. Gibson, Princeton, N.J.; Roger D. Thompson, Lancaster, Pa.

[73] Assignee: RCA Corporation, New York, N.Y.

[21] Appl. No.: 62,787

[22] Filed: Aug. 1, 1979

[51] Int. Cl.³ .................................................. H04N 9/535
[52] U.S. Cl. ................................................................. 358/31
[58] Field of Search ..................... 358/31, 27; 307/304; 357/24; 328/166

[56] References Cited

U.S. PATENT DOCUMENTS

| | | | |
|---|---|---|---|
| 3,604,844 | 9/1971 | Ross | 358/27 |
| 3,849,593 | 11/1974 | Brun | 358/27 |
| 4,072,984 | 2/1978 | Kaiser | 358/31 |
| 4,074,321 | 2/1978 | Miller | 358/31 |
| 4,096,516 | 6/1978 | Pritchard | 358/31 |
| 4,158,209 | 6/1979 | Levine | 358/31 |

*Primary Examiner*—Richard Murray

*Attorney, Agent, or Firm*—E. M. Whitacre; W. H. Meagher; W. B. Yorks, Jr.

[57] ABSTRACT

A comb filter apparatus is provided with means for equalizing the delayed and undelayed signal levels at the inputs to the adding or subtracting matrix, whereby maximum cancellation and reinforcement of the undesired and desired signals is effected. An input signal is coupled to an additive or subtractive matrix by way of an undelayed signal path and a delayed signal path. The delayed and undelayed signals at the inputs to the matrix are each coupled to a detector by way of a bandpass filter, which pass frequencies at which the combing of the signal is most critical. The detectors detect the levels of the input signals and apply the detected levels as two inputs to a difference circuit. The two signal levels are compared in the difference circuit to develop a gain control signal. The gain control signal is utilized to control the gain of a gain controllable stage which is coupled in series with one of the signal paths thereby equalizing the levels of the input signals to the combining matrix.

17 Claims, 7 Drawing Figures

COMB FILTER EQUALIZATION CIRCUIT

This invention relates to comb filters in general and, in particular, to circuits for equalizing the input signals to a comb filter matrixing circuit.

Electronic signals which are periodic in nature may be processed advantageously by encoding replicas of the signal which are separated in time by the repetition period. The signal is recovered by extracting the encoded replicas and combining them to recreate the information content of the signal. For example, conventional television broadcast systems are arranged so that much of the brightness (luminance) information contained in an image is represented by signal frequencies which are concentrated about integral multiples of the horizontal line scanning frequency. Color (chroma) information is encoded or inserted in a portion of the luminance signal spectrum around frequencies which lie halfway between the multiples of the line scanning frequency (i.e., at odd multiples of one-half the line scanning frequency).

Chroma and luminance information encoded as described above may be recovered by appropriately combing the composite signal spectrum. Known combing arrangements take advantage of the fact that the odd multiple relationship between chroma signal components and half the line scanning frequency causes the chroma signal components for corresponding image areas on successive lines to be 180° out of phase with each other (so-called interlaced frequency components). Luminance signal components for corresponding image areas on successive lines are substantially in phase with each other (and comprise noninterlaced components). With this half line frequency offset, the appropriate comb filter characteristic for the chroma signal exhibits a series of recurring peaks at odd multiples of half the line frequency and recurring nulls at multiples of line frequency. The appropriate comb filter characteristic for the luminance signal is the complement, with recurring peaks at multiples of line frequency and recurring nulls at odd multiples of half the line frequency.

In a comb filter system, one or more replicas of the composite video signal are produced which are time delayed from each other by at least one line scanning interval (a so-called 1-H delay). The signals from one line are added to signals from a preceding line, resulting in the cancellation of the interlaced frequency components (e.g., chroma) while reinforcing the non-interlaced frequency components (e.g., luminance). By subtracting the signals for two successive lines (e.g., by inverting the signals for one line and then adding the two), the noninterlaced frequency components are canceled while the interlaced frequency components are reinforced. Thus, the luminance and chroma signals may be mutually combed and thereby may be separated advantageously.

It is customary to illustrate a comb filter system in a simplified form, with one direct, undelayed signal path shown as a simple wire and a second delayed signal path including the 1-H delay device, each of the signal paths being coupled to a respective input of a signal adder or subtracter circuit. In actual systems, however, the delayed signal path may include an additional adjustable delay element for matching signal delays which are introduced in the "undelayed" path by practical circuit elements such as amplifiers and the input circuits of the signal adding or subtracting devices themselves. In other systems, the 1-H delay device and associated circuit elements may cause some bandwidth-limiting of the signals passed by the delayed path. In this case, the signals passed by the delayed path can experience a delay in excess of one line scanning interval, which must be compensated by a delay in the "undelayed" path which matches so much of the delay that exceeds 1-H. The 1-H delay through the delayed signal path is critical to ensure that the added or subtracted signals are in a proper phase relationship, thereby providing accurate cancellation and reinforcement of the undesired and desired periodic signals, respectively.

In addition to maintaining the proper phase relationship between the added or subtracted signals, it is also necessary to maintain a proper amplitude relationship between these two signals to ensure maximum cancellation and reinforcement. Delay lines of the ultrasonic type, such as glass delay lines, have a tremendous insertion loss, on the order of 10-15 db. Attenuation of the delayed signals in a glass delay line comb filter must therefore be compensated by an amplifier in the delayed signal path, or a matching attenuator in the undelayed path. Typically, such comb filters require the addition of a manually adjustable compensating element, which must be accurately set during testing and alignment of the comb filter. However, this initial adjustment will not compensate for subsequent changes in the operating characteristics of the comb filter resulting from such effects as component aging and temperature changes. In accordance with the principles of the present invention, a comb filter is provided, including means which automatically and continuously maintains the proper amplitude relationship between the signals provided by the delayed and undelayed signal paths.

While it is desirable to comb the video signal over the entire luminance bandwidth, it has been found to be most important to provide equal signal levels for maximum cancellation of undesired signals over the narrower bandwidth of the chroma signals (approximately one megahertz). In accordance with a further aspect of the present invention, the amplitudes of the delayed and undelayed signals are compared over the chroma passband, and their levels equalized on the basis of this comparison. Equalizing the signal levels on this basis ensures that maximum cancellation will occur where the interleaved chroma signals are at their highest levels, since incomplete cancellation in this frequency range can cause the most severe conditions of chroma-luminance crosstalk.

The maintenance of maximum cancellation of the undesired signal in a comb filter is even more significant when a color television encoding format, such as that described in U.S. Pat. No. 3,872,498 of Dalton H. Pritchard, is employed. In this format, the modulated color subcarrier is not placed at the high end of the luminance signal video band as in the NTSC system, but rather is "buried" within the video band, i.e., with the color subcarrier frequency chosen to be significantly lower than the NTSC subcarrier frequency value of 3.58 MHz. In the example presented in that patent, the subcarrier is located at approximately 1.53 MHz, with 500 KHz color sidebands located between approximately one and two megahertz. For typical visual scenes, luminance components are likely to appear interleaved in the 1-2 MHz mid-band region with greater energy content than in the upper band to which the NTSC format consigns the chroma signal. Thus, there is a greater possibility of luminance crosstalk into the color signals with this buried subcarrier format, a problem which is best solved by combing the luminance signal components out of the chroma signal as thoroughly as possible. Likewise, the dot pattern associated with the display of subcarrier components at mid-band luminance frequencies is significantly coarser and thus more visible than the dot pattern associated with the display of subcarrier components at the highband frequencies assigned in the NTSC format (approximately 3-4 MHz), wherefore a severe problem of chroma crosstalk into luminance might normally be expected to accompany mid-band sharing. This problem may be averted by canceling the chroma signal as fully as possible in the luminance comb filter.

In accordance with the principles of the present invention, a comb filter apparatus is provided with means for equalizing the delayed and undelayed signal levels at the inputs to the adding or subtracting matrix, whereby maximum cancellation and reinforcement of the undesired and desired signals is effected. An input signal is coupled to an additive or subtractive matrix by way of an undelayed signal path and a delayed signal path. The delayed and undelayed signals at the inputs to the matrix are each coupled to a detector by way of a bandpass filter, which passes frequencies at which the combing of the signal is most critical. The detectors detect the levels of the input signals and apply the detected levels as two inputs to a difference circuit. The two signal levels are compared in the difference circuit to develop a gain control signal. The gain control signal is utilized to control the gain of a gain controllable stage which is coupled in series with one of the signal paths thereby equalizing the levels of the input signals to the combining matrix. The gain controllable stage and associated circuitry thus provides automatic and continuous equalization of the levels of the input signals to the combining matrix.

Figure 1:
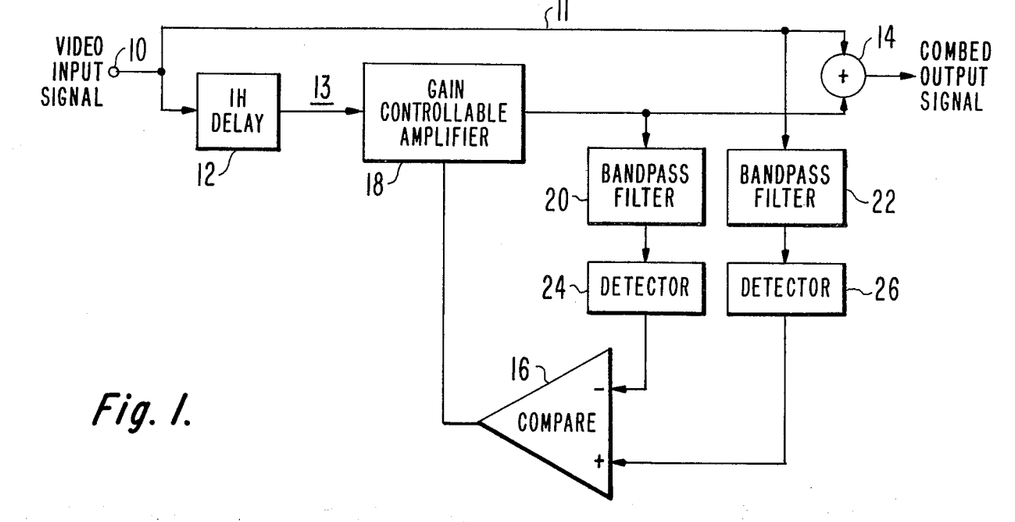
FIG. 1 illustrates, in block diagram form, a comb filter constructed in accordance with the present invention.

Referring to FIG. 1, a comb filter constructed in accordance with the principles of the present invention is shown. A video input signal is applied at an input terminal 10 and is coupled to an adder 14 by way of an undelayed signal path 11 and a delayed signal path 13. The delayed signal path 13 includes a device which delays the video signal by one horizontal scanning interval, which may, for example, be an ultrasonic type delay line such as a glass delay line, or a charge-coupled delay line (CCD). The delayed signal path 13 also includes a gain controllable amplifier 18, the operation of which will be described subsequently.

The two inputs to the adder 14 are also coupled to the inputs of two bandpass filters 20 and 22. The bandpass filters 20 and 22 are adjusted to pass those input signal frequencies over which combing is most critical. For instance, the comb filter of FIG. 1 may be implemented to separate a television luminance signal from a frequency interleaved chroma signal. In the NTSC system, most of the sidebands of chroma information occupy a bandwidth of 1 MHz centered around 3.58 MHz, which are frequency interleaved with higher frequency luminance information signals. In this example, the bandpass filters would be adjusted to pass those luminance and chroma signals occupying this 1 MHz band, since it is most important to accurately separate the two signals over this shared frequency band.

The outputs of the bandpass filters 20 and 22 are coupled to the inputs of two amplitude detectors 24 and 26. The detectors detect the signal levels passed by the bandpass filters, and may operate as average (D.C. content) detectors, peak signal detectors, or detectors which are keyed to some other indicia of signal amplitude, such as the sync pulse or porch level. The detected signal levels are applied as input signals to the inputs of a comparator 16. The comparator 16 develops a difference signal which is used to control the gain of the gain controllable amplifier 18.

The bandpass filters 20 and 22, the detectors 24 and 26, the comparator 16 and the gain controllable amplifier 18 ensure that the delayed and undelayed signals which are combined by the adder 14 are of substantially equal levels so as to provide maximum reinforcement of desired signals and cancellation of undesired signals in the combed output signal developed by the adder 14. By comparing the detected signal levels of the adder input signals and controlling the gain controllable amplifier accordingly, the circuit continuously maintains equal signal levels at the inputs of the adder 14. In the example given for the separation of the NTSC luminance and chroma signals, the signal levels are maintained by examining the bandpassed frequency range over which the two input signals are frequency interleaved, and maintaining the adder input signals accordingly. The equal signal levels will be maintained without any manual preadjustment of the circuitry, and will continually compensate for variations in the level of the delayed signals caused by the 1-H delay device 12.

Figure 2:
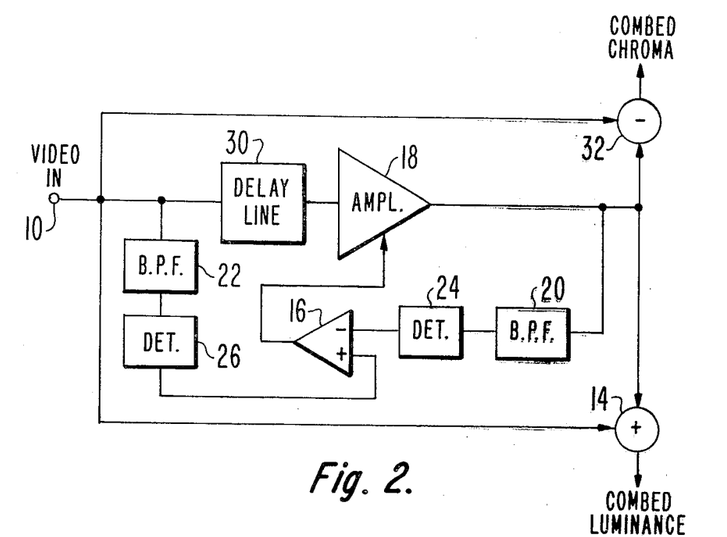
FIG. 2 illustrates, in block diagram form, an embodiment of the present invention which produces two combed output signals.

The comb filter shown in FIG. 2 is similar to that of FIG. 1, differing in that a subtractor 32 is included to provide a second, complementary combed output signal. In addition, the 1-H delay 12 of FIG. 1 is replaced by a delay line 30, having a delay that, when combined with the delay provided by amplifier 18, produces a signal at the output of the amplifier 18 which is delayed by one horizontal scanning interval with respect to the incoming video signal at the input to the delay line 30. The delay line 30 is preferably a broad band device, thereby permitting combing over the full range of frequencies of both the luminance and chroma signals. The adder 14 and the subtractor 32 each receive an undelayed signal from the input terminal 10 and a delayed amplitude equalized signal from the delay line 30 and the amplifier 18. The chroma signal is cancelled in the adder 14 to produce a combed luminance signal at the output of the adder. Likewise, the luminance signal is cancelled in the subtractor 32 to produce a combed chroma signal at the subtractor output. The remaining functional elements in FIG. 2 are the same as those described in FIG. 1 and bear the same reference numerals.

Figure 3:
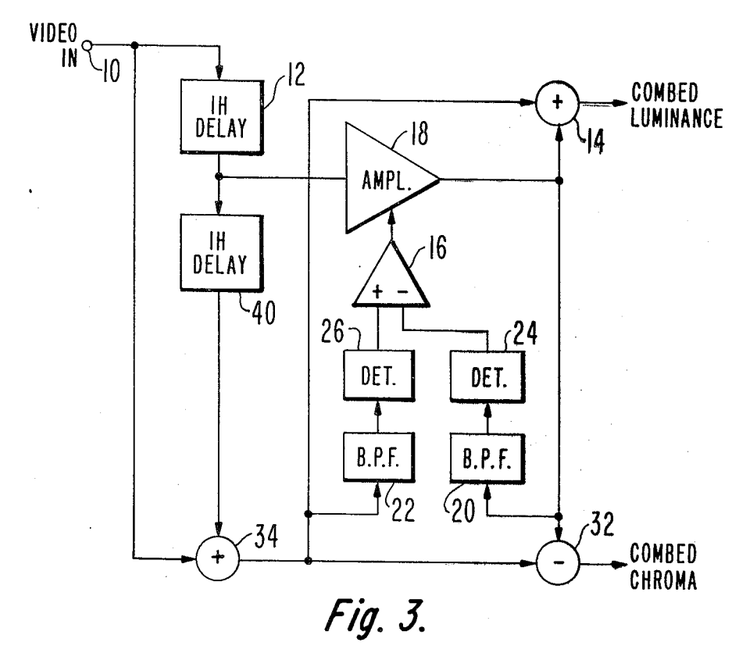
FIG. 3 illustrates, in block diagram form, a comb filter utilizing two delay devices constructed in accordance with the principles of the present invention.

In FIG. 3, a comb filter is illustrated containing two 1-H delays to produce complementary, full sine wave combed output responses. The responses of the two combing circuits will have equal passband and null regions throughout the combed spectrum. An input video signal is applied at an input terminal 10 and is coupled to the input of a 1-H delay 12 and an input of an adder 34. The delayed signal at the output of the 1-H delay 12 is coupled to the input of a second 1-H delay 40 and to the input of an amplifier 18. The output of the second 1-H delay 40 is coupled to a second input of the adder 34, where the twice-delayed signal is added to the undelayed input signal.

The output of the adder 34 is coupled to a second adder 14 and a subtractor 32, which also receive inputs from the amplifier 18. The output of the adder 34 is also coupled to an input of a comparator 16 by way of a first bandpass filter 22 and a detector 26. The once-delayed and amplified signal at the output of the amplifier 18 is coupled to a second input of the comparator 16 by way of a second bandpass filter 20 and a second detector 24. The difference signal developed at the output of the comparator 16 is used to control the gain of the amplifier 18.

The signal applied to adder 14 and subtractor 32 from adder 34 is the sum of two signals (the undelayed signal and the twice-delayed signal) and therefore will have an average amplitude which is twice that of the once-delayed signal applied to the other inputs of the adder 14 and subtractor 32 by the amplifier 18. To compensate for this difference, the amplifier 18 will have a nominal gain of two. The input signals to the adder 14 and subtractor 32 will be precisely equalized by varying the gain of amplifier 18 about this nominal value in response to the difference signal produced by the comparator 16. Combed luminance and chroma signals will be produced at the outputs of adder 14 and subtractor 32, respectively.

Figure 4:
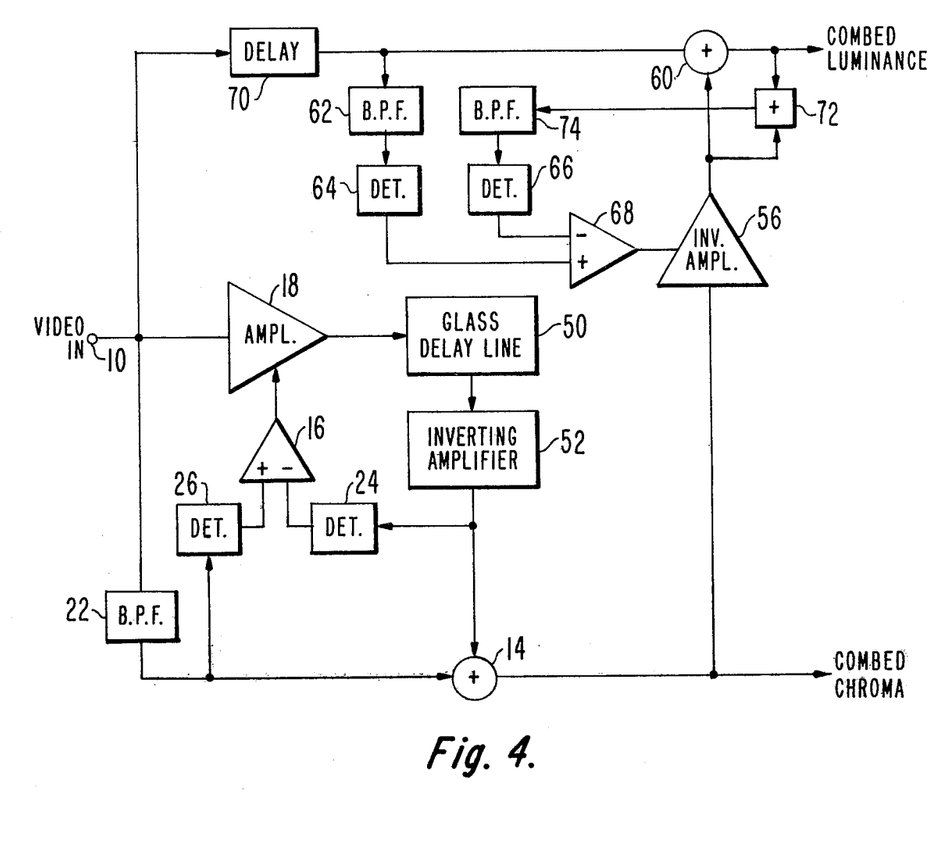
FIG. 4 illustrates, in block diagram form, a comb filter utilizing a glass delay line constructed in accordance with the principles of the present invention.

In FIG. 4, a comb filter is shown in which a chroma signal is separated by a comb filter including a narrow band glass delay line. The separated chroma signal is then subtracted from the composite video input signal to develop a combed luminance signal. The video input signal is applied at an input terminal 10 and is coupled to an amplifier 18 and a bandpass filter 22. The amplified input signal is coupled from the amplifier 18 to the input of a glass delay line 50. The glass delay line 50 typically exhibits a high insertion loss of approximately 10–15 db, which is compensated by the gain of the amplifier 18. The glass delay line also exhibits a narrow passband of approximately 1 MHz, which is substantially the same as the frequency location and bandwidth of the chroma information of the video signal. The chroma signal produced at the output of the adder 14 will thus be combed over the chroma passband of the glass delay line.

The delayed signal at the output of the glass delay line 50 is inverted by an inverter 52 and applied to an input of an adder 14. This delayed signal is also coupled to a detector 24 and the detected signal is applied as an input to a comparator 16. The bandpass filter 22 exhibits a passband which substantially matches that of the glass delay line 50. The bandwidth reduced signal at the output of the bandpass filter 22 is coupled to the other input of the adder 14 and is applied as a second detected input signal to the comparator 16 by way of a detector 26. The comparator 16 will therefore develop a difference signal based upon the signal level difference between the delayed and undelayed signals occupying the like chroma passband of the glass delay line 50 and the bandpass filter 22. This difference signal is used to control the gain of the amplifier 18, which minimizes amplitude differences of the input signals to the adder 14 over the passband of the glass delay line 50.

The combed chroma signal at the output of the adder 14 is coupled to the input of an inverting amplifier 56. The inverted chroma information is then applied as one input of an adder 60. The other input of the adder 60 is coupled from the input terminal 10 by way of a delay 70. The delay 70 delays the video input signal by a period which compensates for any delay applied to the chroma signal due to bandwidth reduction in the chroma comb. The delay 70 ensures that the chroma information of the input video signal will be antiphase with respect to the inverted chroma information provided by the inverting amplifier 56 at the inputs to the adder 60. The antiphase relationship provides accurately controlled cancellation of the chroma information in the adder 60 so that a cleanly combed luminance signal will be produced.

Maximum cancellation of the chroma information in the luminance circuit is obtained by the inclusion of a second gain-controlling comparison circuit in accordance with the principles of the present invention. The inverted chroma information signal at the output of the inverting amplifier 56 is coupled to one input of a summing circuit 72, where it is combined with the combed luminance output signal from the adder 60. The combined signal, which contains both luminance and chroma information, is coupled to a bandpass filter 74, which passes the chroma information and the luminance information interleaved in frequency over the chroma band. This signal is detected by a detector 66 and applied as one input of a comparison circuit 68. The video signal at the output of the delay 70 is also applied to a bandpass filter 62, which passes the chroma information and luminance information interleaved therewith over the chroma band to a detector 64. The detected signal is applied as a second input to the comparison circuit 68. The difference signal developed at the output of the comparison circuit 68 is used to control the gain of the inverting amplifier 56. The amplitudes of the two input signals to the adder 60 are thereby equalized.

The configuration of FIG. 4 will operate satisfactorily if the adder 60 has a constant unity gain, as by the use of a resistive adding matrix. The unity gain will maintain the luminance components at the inputs to the comparison circuit 68 in a substantially equal amplitude relationship, which causes the comparison circuit to adjust the gain of the inverting amplifier 56 for only chroma variations. If the luminance signal components which are applied to the summing circuit 72 and the bandpass filter 62 are unequal, the output of the comparison circuit will be affected and the difference signal must be compensated to allow for the imbalance. This is particularly important when the video signal contains little or no chroma information. In this instance, the comparison circuit will try to vary the gain of the inverting amplifier 56 to overcome any luminance signal difference in the compared signal paths, a condition over which the inverting amplifier has no control. This problem may be averted by disabling the difference signal produced by the comparison circuit 68 in the absence of significant chroma information, which may be accomplished by an appropriately applied inhibit signal from the automatic color killer circuit, or from the detection of a low chroma signal level at the output of the adder 14, inverting amplifier 56, or detector 66.

Figure 5:
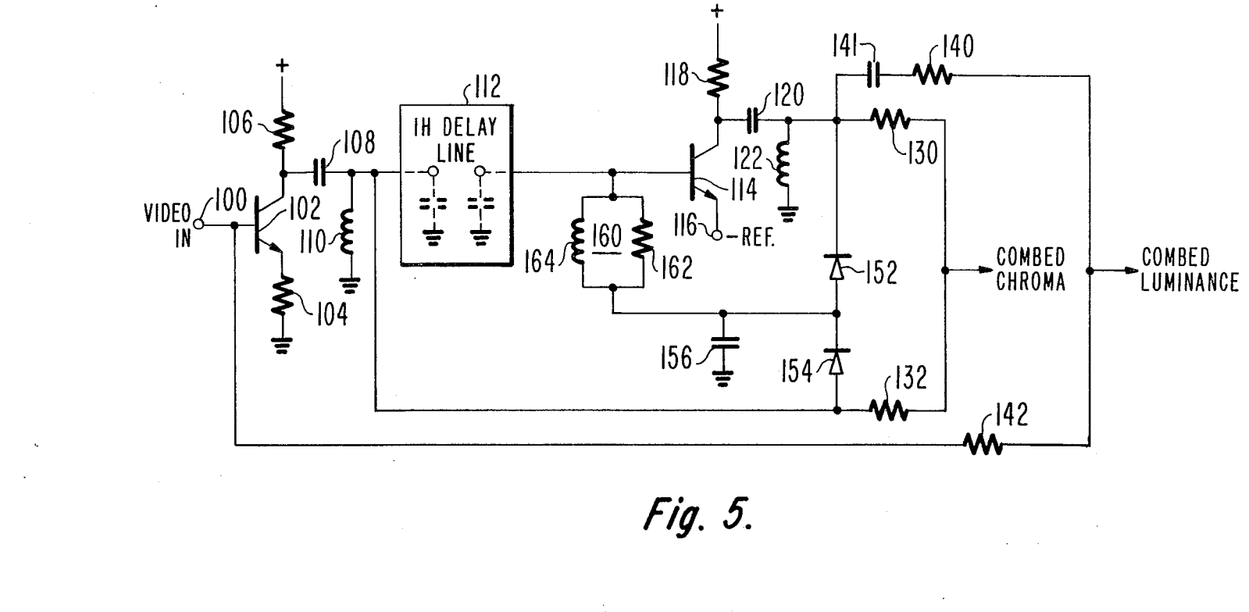
FIG. 5 illustrates, in schematic diagram form, a narrow-band comb filter constructed in accordance with the principles of the present invention.

In FIG. 5, a comb filter constructed in accordance with the present invention is shown in schematic diagram form. A video input signal is applied to terminal 100 and coupled to the base of a transistor 102. Transistor 102 receives D.C. bias from an emitter resistor 104 coupled to ground, and a collector resistor 106 coupled to a source of supply potential. The video signal at the collector of transistor 102 is coupled by a bandpass filter to the input of a 1-H delay line 112, the anode of a diode 154, and a resistor 132. The bandpass filter includes a series capacitor 108 and an inductor 110, which are tuned to resonate with the input capacitance of the 1-H delay line 112 to pass those signals which are in the vicinity of the chroma carrier frequency. These signals are delayed by the 1-H delay line 112 for the scanning time of one horizontal line and applied to the base of a transistor 114. The collector of transistor 114 is coupled to the source of supply potential by a resistor 118, and its emitter is coupled to a negative reference potential at terminal 116. The delayed signals are then coupled by a second bandpass filter, including series capacitor 120 and shunt inductor 122, to the junction of a capacitor 141, a resistor 130, and the cathode of a diode 152. The anode of diode 152 is coupled to the cathode of diode 154, and to one plate of a capacitor 156, the other plate of which is coupled to ground. The junction of the two diodes is also coupled to the base of transistor 114 by a parallel resonant circuit 160, which includes a resistor 162 and an inductor 164. Resonant circuit 160 is tuned to resonate with the output capacitance of the 1-H delay line 112.

Resistors 130 and 132 are joined at the ends which are remote from diodes 152 and 154 to form a matrix which produces a combed chroma signal. Likewise, the delayed signals supplied by way of capacitor 141 are coupled by a resistor 140 to one end of a resistor 142, the other end of which is coupled to the video input terminal 100, so as to produce a combed luminance signal at the junction of resistors 140 and 142.

In operation, diodes 152 and 154 detect the voltage levels of the delayed and undelayed signals at the outputs of the second and first bandpass filters, respectively. Any difference between the two signal levels, as may occur, for instance, due to attenuation caused by the 1-H delay line, is stored as a voltage by capacitor 156 and applied as a biasing voltage to the base of transistor 114 by way of tuned circuit 160. This biasing voltage varies with respect to the fixed negative reference voltage at the emitter of transistor 114 to control the gain of the transistor, and will act to equalize the levels of the signals being applied to the chroma matrixing resistors 130 and 132. Thus, maximum cancellation of the luminance signal components will occur at the junction of the resistors 130 and 132, which produces a cleanly-combed chroma signal at the junction of these resistors.

The amplitude-controlled delayed signal at the junction of capacitor 120 and inductor 122 is also applied to luminance matrixing resistor 140 by a D.C. blocking capacitor 141. The amplitude-controlled signal will result in maximum cancellation of the bandpassed chroma components when combined with the input video signal at the junction of resistors 140 and 142. The matrixing, which produces a combed luminance signal, is stabilized by using a large value resistor 104, which maintains the necessary amplitude correspondence between the input video signal and the amplitude-controlled signal at the output of the second bandpass filter.

In FIG. 5, the 1-H delay line is assumed to have a bandpass characteristic, and therefore the use of the bandpass filters in series with the 1-H delay line does not detract from the performance of the luminance combing. However, if a wide band delay line is used, the circuit of FIG. 6 may be employed to provide combing over the full luminance bandwidth.

Figure 6:
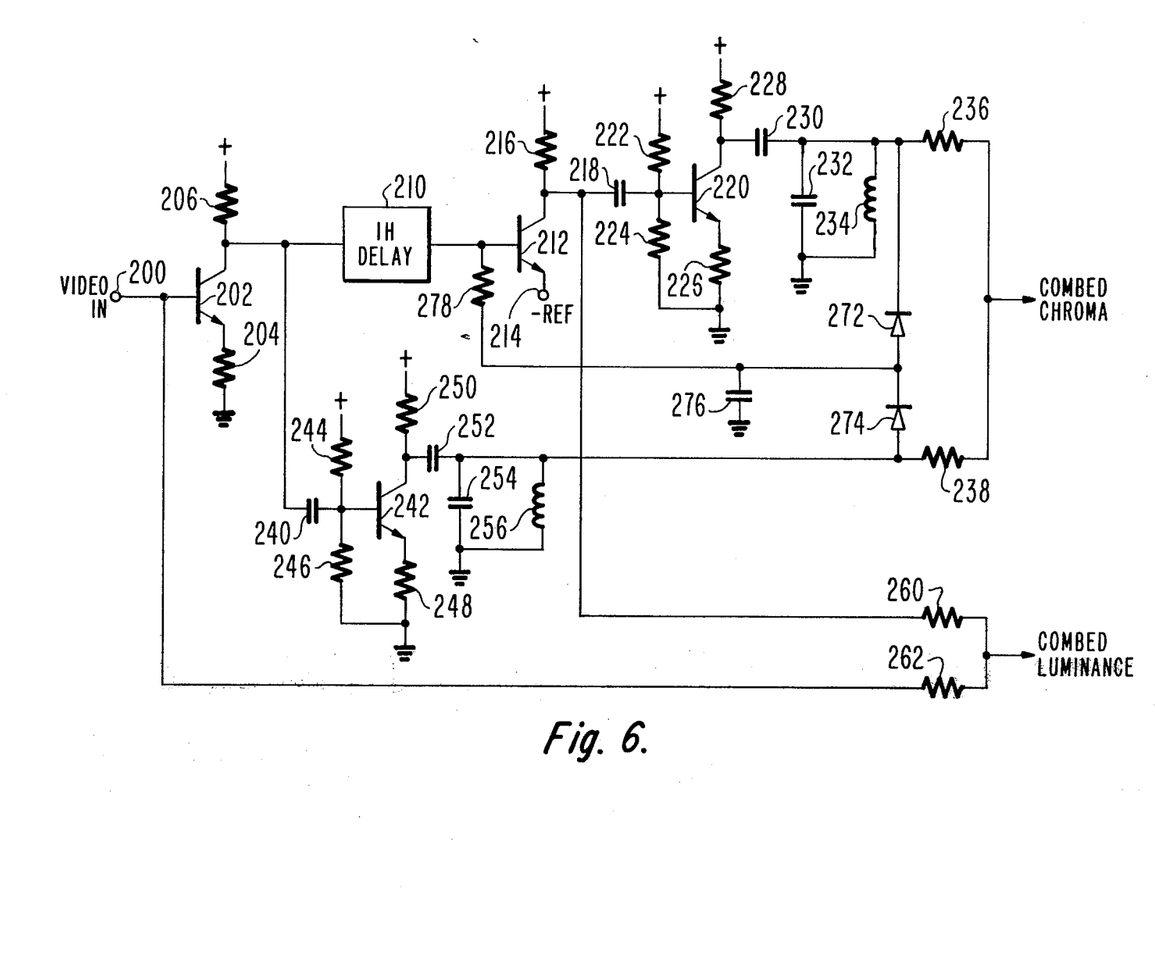
FIG. 6 illustrates, in schematic diagram form, a broad-band comb filter constructed in accordance with the present invention.

In FIG. 6, a video signal is coupled from an input terminal 200 to the base of a transistor 202. The emitter of transistor 202 is coupled to ground by a resistor 204, and its collector is coupled to a source of supply potential by a resistor 206. The signal at the collector of transistor 202 is coupled to the input of a 1-H delay 210, and the delayed signal at the output of the 1-H delay is coupled to the base of a transistor 212. The emitter of transistor 212 is coupled to a terminal 214, to which a negative reference potential is applied. The collector of transistor 212 is coupled to the source of supply potential by a resistor 216, and to the base of a transistor 220 by a capacitor 218. Base bias for transistor 220 is provided by a resistor 222 coupled from the base of transistor 220 to the source of supply potential, and by a resistor 224 coupled from the base to ground. The emitter of transistor 220 is coupled to ground by a resistor 226, and its collector is coupled to the source of supply potential by a resistor 228. The collector of transistor 220 is also coupled to a chroma matrixing resistor 236 by a series capacitor 230 and a bandpass filter coupled at the junction of capacitor 230 and resistor 236, including the parallel combination of a capacitor 232 and an inductor 234. The junction of capacitor 230 and resistor 236 is also coupled to the cathode of a diode 272.

The signal at the input to the 1-H delay 210 is coupled to the base of a transistor 242 by a capacitor 240. The base of transistor 242 is coupled to the source of supply potential by a resistor 244, and to ground by a resistor 246. The emitter of the transistor 242 is coupled to ground by a resistor 248, and its collector is coupled to the source of supply potential by a resistor 250. The collector of transistor 242 is also coupled to the junction of the anode of a diode 274 and a chroma matrixing resistor 238 by a series capacitor 252, and a second bandpass filter, including the parallel combination of a capacitor 254 and an inductor 256 coupled from the junction of capacitor 252 and resistor 238 to ground. The other end of matrixing resistor 238 is coupled to resistor 236 to form a junction at which a combed chroma signal is produced.

The anode of diode 272 is coupled to the cathode of diode 274, and to the base of transistor 212 by a resistor 278. A capacitor 276 is coupled between the junction of diodes 272 and 274 and ground.

The delayed signal at the collector of transistor 212 is applied to a luminance matrix resistor 260. The video input signal is applied to the luminance combing circuit by a resistor 262, which is coupled between the video input terminal 200 and resistor 260.

In operation, the video input signal is inverted by transistor 202, delayed by one horizontal scanning period by the 1-H delay 210, and inverted a second time by transistor 212. The delayed, twice-inverted signal is coupled by inverting transistor 220 and the first bandpass filter to the detector diode 272 and to the chroma matrixing resistor 236. The first and second bandpass filters pass only those signal frequencies which are in the vicinity of the chroma subcarrier, which is the bandwidth over which combing is most important. Similarly, the undelayed, once-inverted signal at the input to the 1-H delay is coupled by a transistor 242 and the second bandpass filter to the second detector diode 274 and the second chroma matrixing resistor 238. The detected signal level at the junction of the diodes 272 and 274 develops a voltage across capacitor 276, which represents the signal level difference between the delayed and undelayed input signals to the chroma matrix. This voltage is applied to the base of transistor 212 by a resistor 278, and its variation with respect to the negative reference potential at the emitter of transistor 212 causes the gain of the transistor to vary so as to equalize the levels of the input signals to the chroma matrix. Thus, maximum cancellation of the luminance signal components and reinforcement of the chroma signal components will occur at the junction of resistors 236 and 238.

The amplitude-controlled, delayed signal at the collector of transistor 212 is combined with the input video signal by the luminance matrixing resistors 260 and 262. It may be seen that the delayed signal at the collector of transistor 212 has not been bandwidth limited, and therefore combing will occur over the full luminance bandwidth. The amplitude-controlled signal will also bear a constant relation to the input video signal by virtue of its coupling through the fixed gain transistor 202, and by reason of the comparison of the input and output signals of the 1-H delay 210, which adjusts the signal level at the collector of transistor 212 only for signal level variations caused by the 1-H delay. Thus, the input signals to the luminance comb will be of equal signal level, with the chroma signal components in phase opposition so as to cause maximum chroma cancellation and luminance signal reinforcement.

Figure 7:
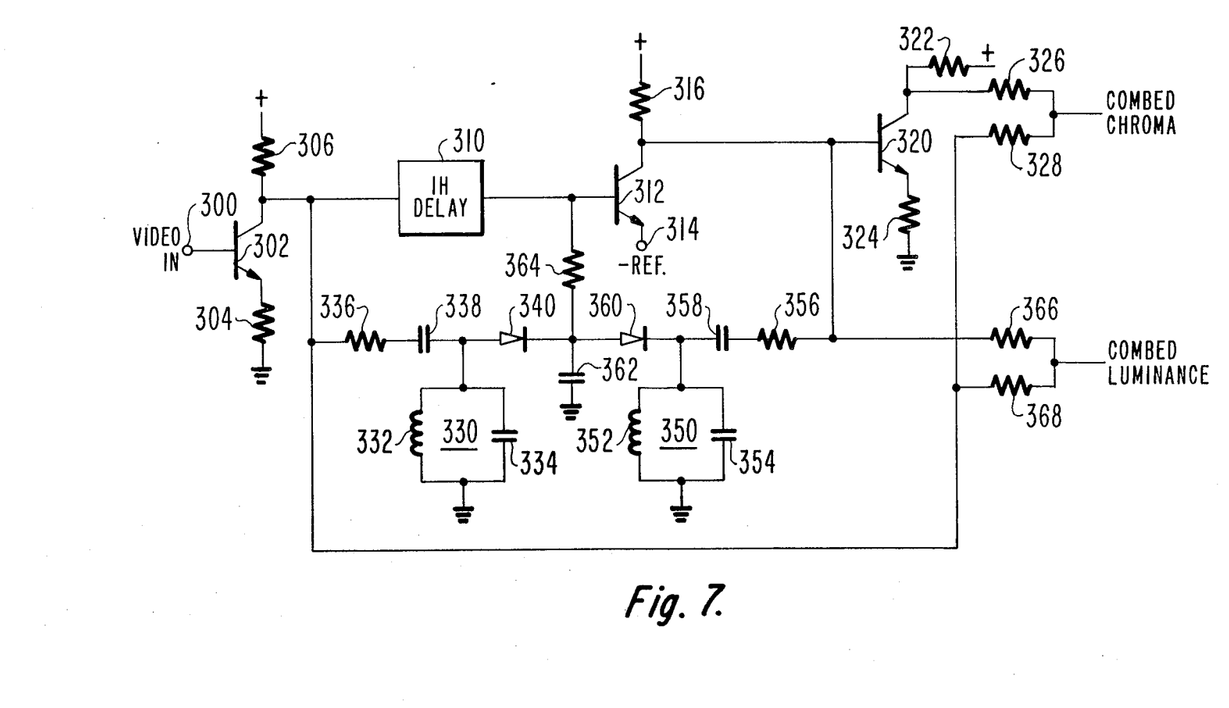
FIG. 7 illustrates, in schematic diagram form, a comb filter suitable for use with a buried subcarrier video signal.

A circuit arrangement such as that illustratively shown in FIG. 7 may be used to separate the chroma and luminance components of a "buried subcarrier" format signal, such as that described in the aforementioned U.S. Pat. No. 3,872,498. Since the color information is interleaved with lower frequency luminance information (e.g., around 1.53 MHz), it is important that the color information be completely removed from the luminance signal. Unremoved color information will appear as lower frequency noise in the luminance signal, and will be 25 db more visible than color information that is not removed from an NTSC (3.58 MHz subcarrier) luminance signal.

In the circuit arrangement of FIG. 7, the bandpass filters are not coupled in series with the matrixed signal paths. This ensures broad-band combing, which separates the luminance and chrominance signals over the full video signal band. The video input signal is applied at a terminal 300 and is coupled to the base of a transistor 302. The emitter of transistor 302 is coupled to ground by a resistor 304, and its collector is coupled to a source of supply potential by a resistor 306. The video signal at the collector of transistor 302 is coupled to a chroma matrixing resistor 328, a luminance matrixing resistor 368, a resistor 336, and the input of a 1-H delay 310. The resistors 336, 328 and 368 should have sufficiently large values so as not to unduly load the collector of transistor 302. If desired, transistor 302 may be arranged in a common collector configuration, so as to present a low emitter impedance to these resistors.

The other end of the resistor 336 is coupled by a capacitor 338 to the anode of a diode 340. A tuned circuit 330 acts as a bandpass filter to apply signals in the vicinity of the buried subcarrier (e.g., 1.53 MHz) to the diode 340 and comprises an inductor 332 and a capacitor 334 coupled in parallel between the anode of the diode 340 and ground.

The video signal at the output of the 1-H delay 310 is delayed by the scanning period of one horizontal line and is inverted in phase with respect to the signal at its input. The output of the 1-H delay 310 is coupled to the base of a gain controlled transistor 312, the emitter of which is coupled to a terminal 314. A negative reference potential is applied to this terminal 314. The collector of transistor 312 is coupled to the source of supply potential by a resistor 316, the base of a transistor 320, a luminance matrixing resistor 366, and a resistor 356. The other end of the resistor 366 is coupled to resistor 368 to produce a combed luminance signal. The other end of resistor 356 is coupled by a capacitor 358 to the cathode of a diode 360. A second tuned circuit 350 is coupled between the cathode of the diode 360 and ground and operates in like manner to tuned circuit 330 to apply signals in the vicinity of the buried subcarrier to the diode 360. The tuned circuit 350 comprises the parallel combination of an inductor 352 and a capacitor 354. The anode of the diode 360 is coupled to the cathode of the diode 340 and to one plate of a capacitor 362, the other plate of which is coupled to ground. The voltage developed across the capacitor 362 is applied as a gain control voltage to the base of transistor 312 by a resistor 364.

The emitter of transistor 320 is coupled to ground by a resistor 324. The collector of the transistor 320 is coupled to the source of supply potential by a resistor 322, and to a chroma matrixing resistor 326. The other end of the resistor 326 is coupled to the resistor 328 to produce a combed chroma signal at their junction.

The video signal at the input to the 1-H delay 310 and the matrixing resistors 328 and 368 is applied to the detector diode 340 which, by operation of tuned circuit 330, detects the signal level in the vicinity of the color subcarrier frequency and applies the detected signal level to the capacitor 362. Simultaneously, the delayed video signal at the base of transistor 320 and the matrixing resistor 366 is applied to the other detector diode 360 which, by operation of tuned circuit 350, detects the level of the delayed signal in the vicinity of the color subcarrier frequency and applies this detected signal level to the capacitor 362. The net voltage level across the capacitor 362 is thereby representative of the difference between the two detected signal levels. This voltage is applied to the base of gain controlled transistor 312, where it adjusts the gain of the transistor so as to equalize the levels of the delayed and undelayed video signals. The equal signal levels which are then applied to the matrixing resistors of the two combing circuits will thus provide maximum cancellation and reinforcement of the undesired and combed signals at the chroma and luminance outputs.

The information content of the luminance and chroma signal will normally be approximately the same from line to line, which makes the combing concept a practical reality. However, some line-to-line signal differences will generally be present, as the scene content is usually not uniform, and signal transitions will occur.

Usually these differences will not be sizeable, but will be significant enough so that the detected signal level of an undelayed line will not be exactly the same as that of the previous, delayed line. Thus, exact equalization of the levels of the delayed and undelayed signals in a comb filter is neither necessary nor desirable, since such line-by-line equalization would produce a distorted picture image. The purpose of the present invention is to equalize long-term signal level inequalities, such as those that may result from delay line component aging or temperature changes. For this reason, the capacitor 362 and the resistor 364 of FIG. 7, and their complementary components in FIG. 5 (capacitor 156, resistor 162, and inductor 164) and FIG. 6 (capacitor 276 and resistor 278) should be chosen to have values which produce a long time constant as compared to a line scanning interval. This time constant, which may be on the order of the scanning interval of an entire video field, will prevent a system of the present invention from introducing line-by-line video distortion into the reproduced picture image.

What is claimed is:

1. A comb filter for separating two frequency interleaved signal components of a television signal comprising:
   a source of video input signals, including two frequency interleaved signal components;
   means having two inputs for combining signals at said inputs to develop a combed output signal;
   first and second signal paths coupled from said input signal source to the inputs of said combining means;
   means, included in one of said signal paths, for delaying the signals in said one path by the scanning time of one horizontal television line;
   a first amplitude detector, having an input coupled to one of the inputs of said combining means, and an output and exhibiting a time constant which is long as compared to a television line scanning interval;
   a second amplitude detector, having an input coupled to the other input of said combining means, and an output and exhibiting a time constant which is long as compared to a television line scanning interval;
   means, having first and second inputs coupled to the outputs of said amplitude detectors, and an output for developing a control signal proportional to the long-term variation in signal amplitudes detected by said amplitude detectors; and
   means, included in one of said signal paths, and responsive to said control signal, for controlling the signal level on said path.

2. The comb filter of claim 1, wherein said combining means adds the two signals at its inputs.

3. The comb filter of claim 1, wherein said combining means subtracts the two signals at its inputs.

4. The comb filter of claim 1, wherein said amplitude detectors are average detectors.

5. The comb filter of claim 1, wherein said amplitude detectors detect the signal level peaks of the signals applied thereto.

6. The comb filter of claim 5, further comprising:
   a first bandpass filter coupled between said one input of said combining means and said input of said first amplitude detector; and
   a second bandpass filter coupled between said other input of said combining means and said input of said second amplitude detector.

7. The comb filter of claim 6, wherein said bandpass filters each passes a range of frequencies including the frequency of a color subcarrier signal.

8. The comb filter of claim 1, wherein said signal level controlling means is coupled in series with said delaying means.

9. The comb filter of claim 1, wherein said signal level controlling means comprises a fractional gain amplifier which is coupled in the signal path which does not include said delaying means.

10. A comb filter for separating the luminance and chrominance components of a composite video signal comprising:
    a source of video signals having frequency interleaved luminance and chrominance components;
    a summing circuit, having a first input coupled to said signal source, a second input, and an output, for producing a first combed output signal;
    a difference circuit, having a first input coupled to said signal source, a second input, and an output, for producing a second combed output signal;
    means, coupled between said signal source and said second inputs of said summing and said difference circuits, for delaying said input signals;
    a first bandpass filter having an input coupled to said signal source and an output;
    a second bandpass filter having an input coupled to the second inputs of said summing and said difference circuits and an output;
    first and second amplitude detectors having respective inputs coupled to the respective outputs of said first and second bandpass filters, and having respective outputs;
    means having inputs coupled to said outputs of said first and second amplitude detectors, and an output for developing a gain control signal; and
    an amplifier, responsive to said gain control signal, and coupled in series with said delaying means.

11. A comb filter for separating the luminance and chrominance components of a video signal comprising:
    a source of video signals having frequency interleaved luminance and chrominance components;
    first means, having an input coupled to said signal source and an output, for delaying said input signals;
    second means, having an input coupled to the output of said first delaying means and an output, for delaying the signals applied thereto;
    a first summing circuit having a first input coupled to said signal source, a second input coupled to the output of said second delaying means, and an output;
    a second summing circuit, having a first input coupled to the output of said first summing circuit, a second input, and an output for producing a first combed output signal;
    a difference circuit, having a first input coupled to the output of said first summing circuit, a second input, and an output for producing a second combed output signal;
    a first bandpass filter, having an input coupled to the second inputs of said second summing circuit and said difference circuit, and an output;
    a first amplitude detector, having an input coupled to the output of said first bandpass filter, and an output;

a second bandpass filter, having an input coupled to the output of said first summing circuit and an output;

a second amplitude detector, having an input coupled to the output of said second bandpass filter and an output;

means, having first and second inputs coupled to the respective outputs of said first and second amplitude detectors and an output for developing a gain control signal; and a gain controlled amplifier having an input coupled to the output of said first delaying means and an output coupled to the second inputs of said second summing circuits and said difference circuit, which is responsive to said gain control signal.

12. The comb filter of claim 11, wherein the gain of said gain controlled amplifier is varied about a nominal gain of two.

13. A comb filter for separating two frequency interleaved signals comprising:

a source of video signals including said two freuency interleaved signals;

a first bandpass filter having an input coupled to said video signal source and an output;

a first summing circuit having a first input coupled to the output of said first bandpass filter, a second input, and an output for developing a first combed output signal;

a signal path coupled between said video signal source and the second input of said first summing circuit and including a delay line;

a firsr inverter; and a gain controlled amplifier;

a first amplitude detector having an input coupled to the output of said first bandpass filter and an output;

a second amplitude detector having an input coupled to the second input of said first summing circuit and an output; and means, having first and second inputs coupled to respective outputs of said first and second amplitude detectors and an output coupled to said gain controlled amplifier for controlling the gain thereof.

14. The comb filter of claim 13, further comprising:

a second inverter having an input coupled to the output of said first summing circuit and an output;

means, having an input coupled to said video signal source and an output for delaying said input signals;

a second summing circuit having a first input coupled to the output of said delaying means, a second input coupled to the output of said second inverter, and an output for developing a second combed output signal;

a second bandpass filter having an input coupled to the first input of said second summing circuit and an output;

a third amplitude detector having an input coupled to the output of said second bandpass filter and an output;

a third summing circuit having a first input coupled to the output of said second summing circuit, a second input coupled to the output of said second inverter, and an output;

a fourth amplitude detector having an input coupled to the output of said third summing circuit and an output; and means having first and second inputs coupled to respective outputs of said third and fourth amplitude detectors and an output for developing a gain control signal, wherein said second inverter has a controllable gain and is responsive to said gain control signal for controlling the signal level at said second input of said second summing circuit.

15. A comb filter for separating two frequency interleaved video signal components comprising a first signal path responsive to an input video signal, a second signal path responsive to said input video signal and including means for delaying said signal, means coupled to said signal paths for combining said undelayed and delayed signals, and means for controlling the signal level in one of said signal paths including:

first and second detectors for detecting the amplitudes of signals applied thereto and exhibiting time constants which are long as compared to the scanning time of one horizontal television line;

means, for applying a portion of the frequency spectrum of said undelayed signal to said first amplitude detector;

means, for applying a portion of the frequency spectrum of said delayed signal to said second amplitude detector;

means responsive to said detected signal amplitudes for developing a control signal representative of the long-term variation between said detected signal levels; and gain control means included in one of said signal paths and responsive to said control signal for controlling the level of the signal in said one signal path.

16. The comb filter of claim 15, wherein said control signal developing means comprises a capacitor serially coupled between the junction of said detectors and a point of reference potential.

17. The comb filter of claim 15, wherein said detectors each comprises a semiconductor junction having an output electrode coupled to said capacitor.

* * * * *